April 7, 1970 — J. W. McGUFFEY — 3,504,738
FALLING FILM-TYPE HEAT EXCHANGE UNIT
Filed Oct. 23, 1967 — 3 Sheets-Sheet 1

INVENTOR
JAMES W. McGUFFEY

April 7, 1970  J. W. McGUFFEY  3,504,738
FALLING FILM-TYPE HEAT EXCHANGE UNIT
Filed Oct. 23, 1967  3 Sheets-Sheet 2

INVENTOR
JAMES W. MCGUFFEY
BY Whittemore, Hulbert
Belknap
ATTORNEYS

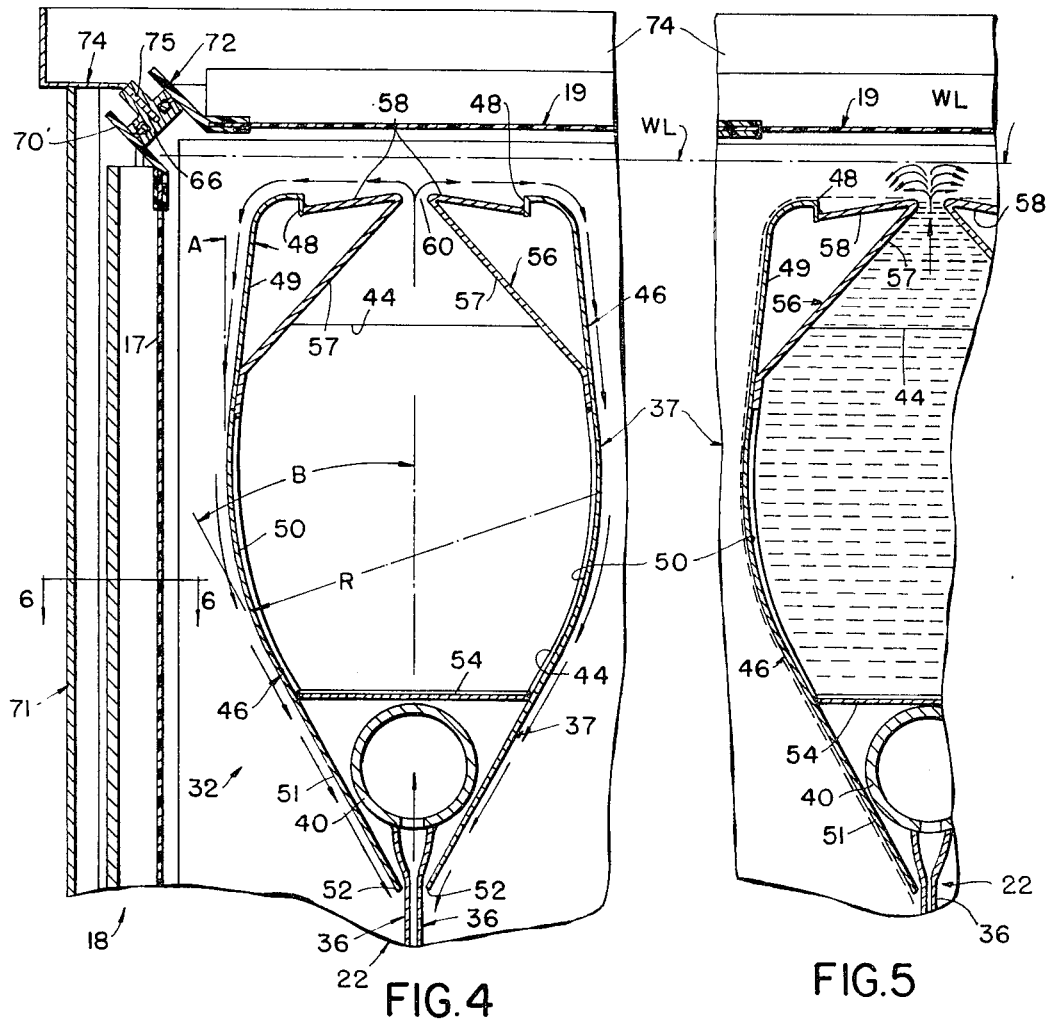
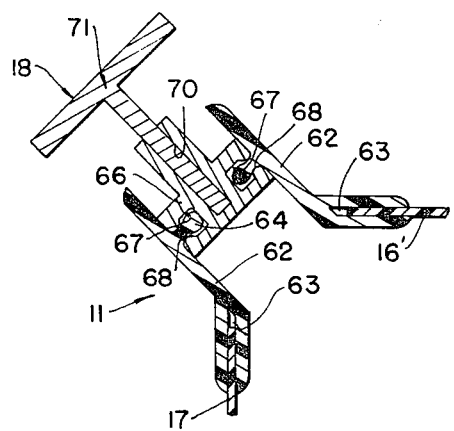
FIG.4
FIG.5
FIG.6
INVENTOR
JAMES G. MCGUFFEY
ATTORNEYS

United States Patent Office
3,504,738
Patented Apr. 7, 1970

3,504,738
FALLING FILM-TYPE HEAT EXCHANGE UNIT
James W. McGuffey, Lansing, Mich., assignor to Tranter Manufacturing, Inc., Lansing, Mich., a corporation of Michigan
Filed Oct. 23, 1967, Ser. No. 677,343
Int. Cl. F28d 3/02
U.S. Cl. 165—117    16 Claims

ABSTRACT OF THE DISCLOSURE

A falling film type of heat transfer or interchange unit is disclosed, in which, in the illustrated embodiment, a bank or series of parallel upright, hollow, substantially flat and vertically elongated heat transfer plates internally circulate a liquid to be cooled. The plates are each externally cooled by a thin film of water which gravitates in a uniform thickness or depth along the sides thereof from an open-topped distributor or manifold thereabove. Each of these is of large internal cross-section and coolant handling capacity, extending the entire horizontal length of its associated transfer plate, and the distributor manifolds receive pump-circulated cooling water from a large stilling box at an upper end thereof. After falling over the sides of the manifolds and down the bank of plates associated therebeneath, the water collects at the bottom of the improved unit and returns to its external water circulating means (not a part of the disclosure).

Each distributor is, as indicated, horizontally elongated in the plane of its associated transfer plate and is of considerable width transverse of that plane, being bottomed by a flat rectangular floor member of substantial area, so that a large volume of coolant water is present therein at all times. Entry of the water from the stilling box or chamber is through large size openings in an upright wall of the box which is common to and constitutes an end wall of the bank of distributors.

Accordingly, and by reason of the large water entry areas, although the water is supplied to the stilling box under substantial pressure there is a relatively slow and non-turbulent horizontal flow within each distributor, again because of its relatively large volume. Hence the pressure therein is largely represented by an upwardly directed head.

An elongated slot-like top orifice is coextensive in length with and merges divergently downwardly with upright side walls of the manifold, being centered therebetween. This orifice thus functions as a sort of venturi to convert the upward pressure head in the distributor manifold to a jetted flow of water at some velocity upwardly and along the entire length of the latter adjoining the orifice. The water gravitates laterally onto mildly inclined ledges directly on opposite sides of the orifice, but is dammed up to an appreciable extent by upright shoulders spaced outwardly from the orifice and defining the sides of said ledges.

These shoulders are continuously rectilinear in shape along their top and at least coextensive in length with the manifold. They are of the same height above the jet-supplied ledges which they outwardly define; and they dam up the cooling liquid atop the distributor to a uniform height or thickness along the length of the latter and at each side of its orifice.

Rising above and flowing over the leveling shoulders, the water gravitates over the upright outer side walls of the reservoir as a thin film of uniform thickness; and those walls converge gradually and inwardly to bottom edges located closely adjacent the upper end of the transfer plate component above which the manifold is associated. Thus a very thin, gravity-accelerated coolant film will nevertheless cling under surface tension to the convergent manifold walls despite inertial or centrifugal effect. There results a highly efficient cooling of the walls of the transfer plate and the liquid circulated in the latter. The cooling water collects at the bottom of the transfer plate and is disposed of.

An upper horizontal and longitudinal header for each transfer plate parallels the distributor manifold directly beneath the latter and within its bottom wall edges. The liquid to be cooled flows upwardly from a main transverse supply leader into and through the transfer plates to said longitudinal headers, under forced circulation by means entirely independent of the circulation of the cooling liquid. The cooled liquid exits from the longitudinal plate headers into a main transverse discharge header, thence to an appropriate destination of one sort or another.

BACKGROUND OF THE INVENTION

Field of the invention

The principle and basic structural improvements of the heat exchange unit of the invention may be carried into practice in many different applications involving a heat transfer, either by way of cooling or heating, from a liquid circulated internally of a plate-like, hollow transfer member to a liquid film circulating externally by gravity over a surface of the same member. A typical application may be in an installation for the manufacture of fertilizer, in which the admixture of nitrous oxide and water produces liquid nitric acid, along with an evolution of considerable heat which must be dissipated. In this instance the acid is circulated through one or more heat transfer plates, while a cooling water film gravitating externally of the latter picks up the heat and carries it away, both the cooled and cooling liquids being continuously circulated positively by appropriate pump means.

Another installation might be in the cooling, externally of an electrical transformer wall, of the oil coolant of the transformer. Another instance might be a dye vat installation. In any instance using structure similar to that herein disclosed, the direction or purpose of the heat transfer action might well be reversed, i.e. to heat rather than cool, either the internally circulated liquid or the externally travelling liquid film.

Description of the prior art

The patent to Van Der Molen, No. 2,616,670, of Nov. 4, 1952, discloses a liquid distribution device of a nature generally similar to that of the invention and, likewise, capable of similar utilization, in that, the Van Der Molen patent relates to a heat transfer operation involving the falling film principle. It discloses the use of a transfer plate similar to that of the present plate assembly, in association with a reservoir from which liquid overflows in the form of a sheet along the side wall of the reservoir and onto the side walls of the transfer plate.

However, the improved subject unit and that of Van Der Molen differ importantly in favor of the former, in that in the patented unit the coolant liquid is supplied for the reservoir overflow through a feed pipe of small internal cross-section and volume, escaping from that pipe into the reservoir proper through a restricted mouth or orifice. It in turn escapes from or overflows the reservoir through a wide space at the top of the reservoir, and not at all under a jetting action. Moreover, the overflow of water from the reservoir is not across a rectilinear dammed top surface, as per the present improvement, but is on the contrary through notches formed along the top edges of the reservoir walls. It has been found that in a dye vat installation such notches occasion a hanging up of lint of the material under treatment, with adverse consequences.

Other heat interchange assemblies utilizing the falling film principle incorporate a ram's horn type of coolant supply superstructure of a costly and unduly tall nature, coupled with a transition piece containing weirs and baffles to distribute flow. Still other installations employ a pan having slots feeding the coolant liquid to a heat transfer plate. In these installations, the phenomenon of surface tension causes the cooling water to cling to the slot and not go cleanly and in uniform volume and film thickness onto the transfer plate.

Insofar as the structure of the transfer plate components of the improved assembly is concerned, although the features thereof are not particularly germane to the invention, a generally similar type of heat exchange member (though mounted in association with an oil cooled electrical transformer) is the subject matter of a patent to Yoder and Kaltz, No. 3,153,447 of Oct. 20, 1964, of common ownership herewith.

SUMMARY OF THE INVENTION

The invention affords a falling film type heat transfer assembly which significantly improves over generally similar prior art arrangements, including that of the Van Der Molen patent, in a number of respects. For one thing, the coolant water is supplied under substantial pump pressure to the top of the assembly, and into the upper distributor manifolds, in relatively great volume through generous sized openings in an inner wall of the stilling box or chamber of the unit, which box is itself of considerable depth and water holding capacity. Thus, the water reaches and traverses the box and enters the distributors with little or no turbulence, and under very slight velocity in the direction of the length of the distributors. Thus, the pressure which exists in the stilling box and in the distributor manifold is essentially a vertically acting liquid pressure head.

The cooling water exits upwardly from the manifold under this head in the form of a longitudinally continuous jet coextensive in length with the top manifold orifice, having been converted into velocity in passing venturi-wise between upwardly convergent side walls of the distributor and through the laterally restricted orifice. The height of this jet corresponds with the level of coolant liquid in the stilling box. Having emerged in jet form, the water falls downwardly onto mildly outwardly and downwardly inclined ledges on either side of the distributor orifice, where it is laterally restrained and dammed up by shoulders defining the outer sides of the ledges. Along these shoulder zones the distributor is truly rectilinear in its extent, not notched as in the Van Der Molen construction. The result is that the flow of liquid over the shoulders is that of a thin film of exactly uniform thickness along the length of the manifold; so that from the very outset the absorption of heat by the external coolant from the transfer plate will be uniform along the length of the latter.

The structure of the invention also improves over the prior art in the manner in which the falling film gravitates over the exterior surfaces of the distributor. At first it flows at a very slightly outwardly divergent angle to the vertical, then passes about an externally convex curvature of mild character, and finally down onto and along a bottom wall portion of the distributor which is at a mild, downwardly convergent angle to the vertical, from which angle the film falls smoothly onto the upright surface of the transfer plate. Insurance is had that the coolant water will not whip; i.e., be centrifically or inertially thrown off the distributor wall before properly reaching the plate surface.

In summation, coupled with the film control action just described, the improved interchange assembly is characterized by one or more generally flat, upright heat transfer units each associated below a distributor manifold of large internal volume which is supplied with cooling water through a copious sized opening of a large capacity stilling box. This makes for a practically insignificant horizontal speed of flow in the distributor, and without turbulence. Manifold pressure acts as an upward head to expel the coolant jet-wise, thet water again coming to a more or less quiescent, dammed up condition before overflowing onto the specially contoured distributor walls described above. It is there gravitatively accelerated to form a very thin film discharge onto the transfer plate surfaces in a controlled manner, with the result that a very efficient heat transfer is obtained, indeed.

As a secondary improvement, the unit also features an upright external casing in which the operating components are enclosed. The casing has rectangular side and end wall panels of non-metallic material united in an improved way with non-metallic and metallic corner members, certain of which are in turn rigidly secured onto a base structure.

BRIEF DESCRIPTION OF THE DRAWINGS

FIG. 4 is a fragmentary view in enlarged scale and in transverse vertical section along 4—4 of FIG. 1, illustrating the relationship at assembly of an upper portion of transfer plate with its distributor manifold, the view showing appropriate dimensional relationships of the improved cross-sectional contouring of the latter, and also indicating in a general way the pattern of flow of cooling water from within the distributor, i.e., in jet, dammed up and film forms about its exterior surfaces;

FIG. 5 is a fragmentary view in vertical section similar to FIG. 4, illustrating a bit better the type of flow referred to;

FIG. 6 is an enlarged scale fragmentary view in horizontal section on line 6—6 of FIG. 4, illustrating a detail of construction of the cabinet means of the unit.

DESCRIPTION OF A PREFERRED EMBODIMENT

Figure 7:
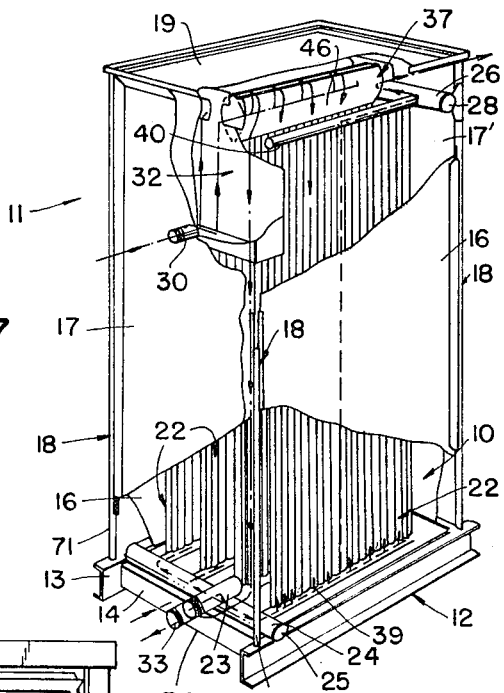
FIG. 7 is a perspective view of the unit, partially broken away at the cabinet wall component of the latter, further illustrating components appearing in FIG. 1–5, this view being provided with arrow-headed lines of flow of the cooling liquid so as in effect to constitute a flow diagram.

The operational heat exchanger assembly proper of the invention, generally designated by the reference numeral 10, is illustrated in substantially its entirety in FIG. 7, being enclosed in a vertically elongated, four walled housing or casing 11. Although sizes will vary in different installations, in a typical one the casing and its base will measure approximately 140 inches in height by about 57 inches across side walls and about 40 inches across end walls. One aspect of the invention deals with the physical construction of the casing, and details thereof will be later described.

For the present, it suffices to state that the casing 11 comprises a relatively massive base 12 constituted by a pair of elongated parallel side channel sections 13 braced by transverse cross channels 14 which are welded at their ends to the inner faces of channels 13. The casing further comprises a pair of parallel upright side panels 16, 16', a pair of parallel upright end panels 17, 17', four upright corner bar units or devices, generally designated 18, by which the side and wall panels are fixedly articulated in a box-line outline, and a top panel 19.

The heat interchange or transfer assembly 10 housed within casing 11 is constituted by a number of the improved units 22, of which there are four in the illustrated embodiment, although the number may of course vary. These are arranged vertically in parallel, laterally spaced planes, being somewhat less in height than the overall structure, and they are serviced with the respective liquids to be cooled and to cool in the following manner.

Figure 1:
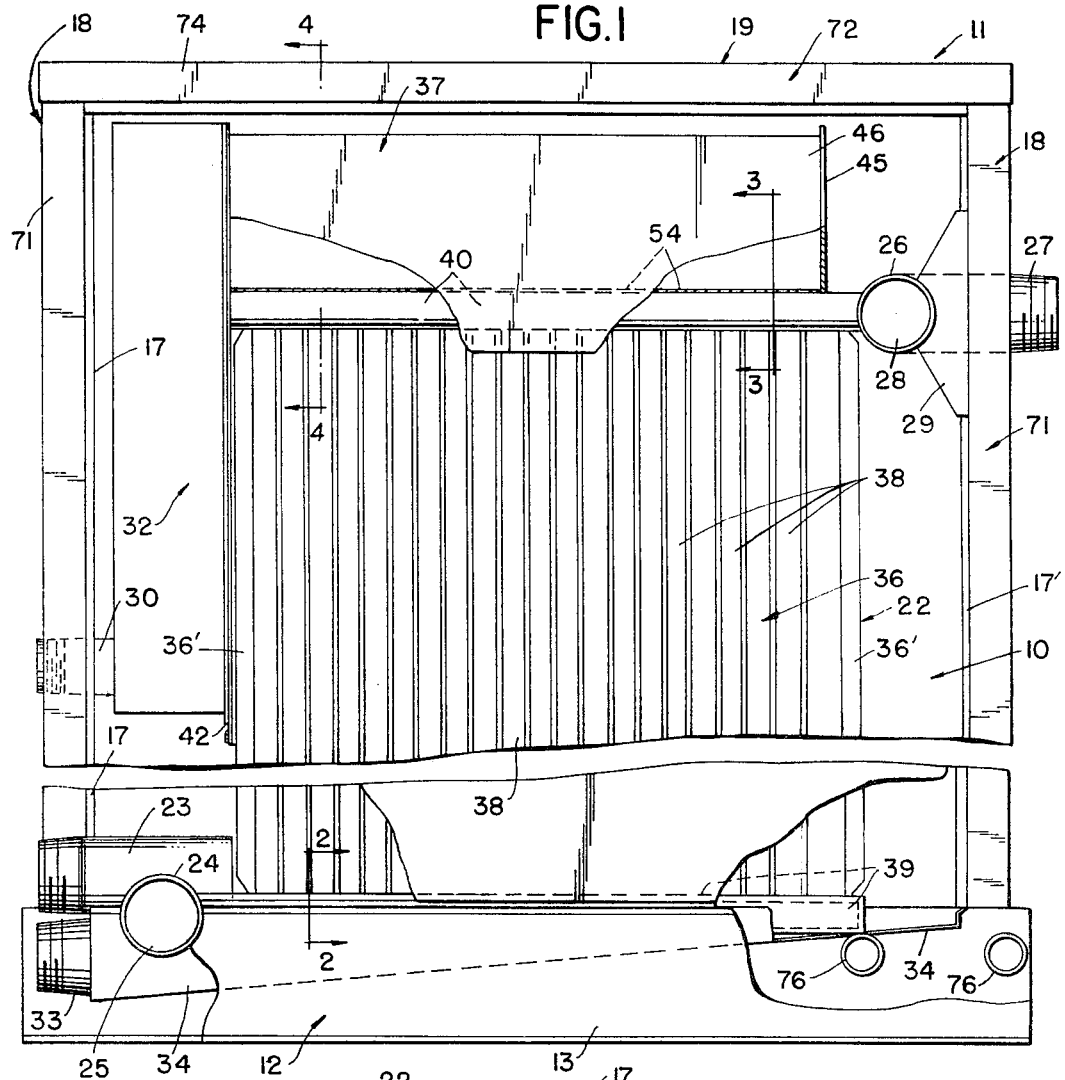
FIG. 1 is a fragmentary side elevational view of the heat interchange unit of the invention, being partially broken away to better show certain components thereof within a facing side wall thereof, these including the stilling box, a distributor manifold associated with the top of a heat transfer plate, and infeed or supply and outfeed or discharge conduit connections for the manifold, stilling box and plate components.
Figure 2:
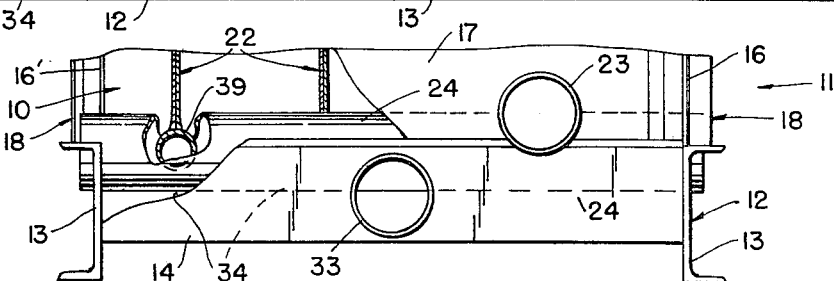
FIG. 2 is a fragmentary end elevational view of the unit, as from the left of FIG. 1, being partially broken away and vertically sectioned transversely along line 2—2 of FIG. 1 to better show the manner in which a header of one of the upright transfer plates communicates longitudinally with a larger main transverse bottom header from which the liquid to be cooled is supplied, this view also illustrating a connection to the last named header of an end infeed pipe fitting or conduit from a supply pump.
Figure 3:
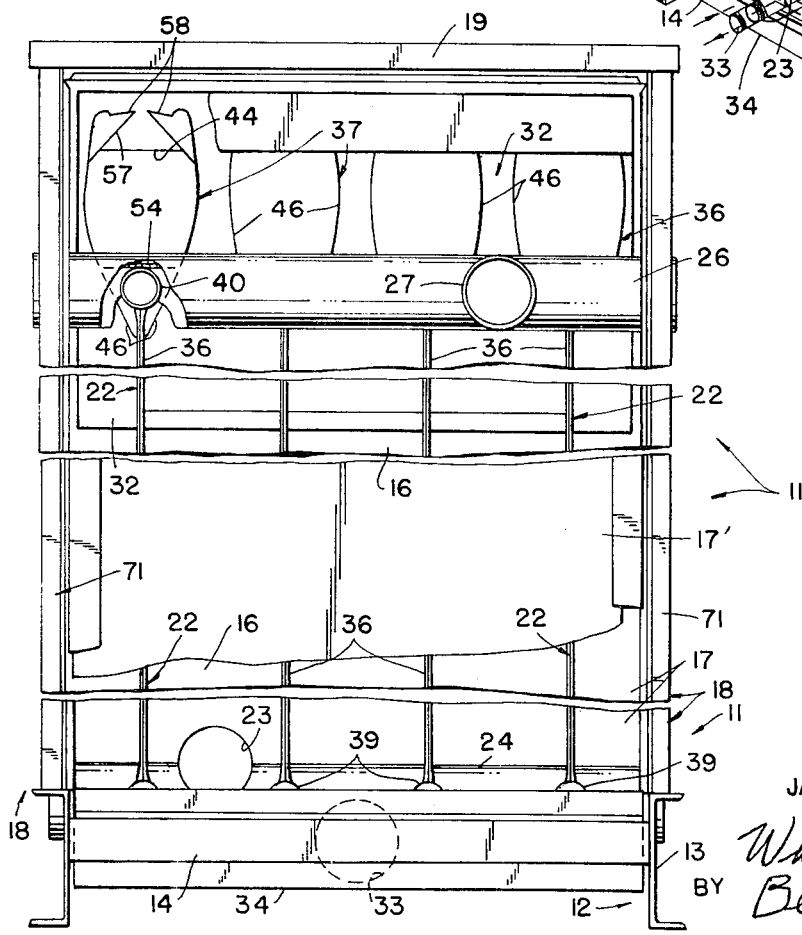
FIG. 3 is a fragmentary end elevational view as from the right of FIG. 1, being partially broken away and in transverse vertical section on line 3—3 of FIG. 1 to show the mode of longitudinal communication of the upper headers of the upright transfer plates with a larger diameter, transverse main discharge header receiving liquid from the plates after it has been cooled, this view also illustrating the connection of a discharge conduit or pipe fitting with this main discharge header.

As shown in FIGS. 1, 2 and 3, taken in conjunction with FIG. 7, a pump-pressurized liquid to be cooled enters the bottom of the interchange assembly 22 through casing end wall 17 via a supply fitting 23, which may be in the form of a four-inch iron pipe. This pipe communicates downwardly with a transversely elongated, main supply header 24 of the same diameter, whence it is distributed in equal volumes to the bottoms of the respective transfer plate units 22. Supply header 24 is closed at its ends, as by appropriate plugs 25. The cooled liquid, having upwardly traversed the interior of the plate portions (to be described) of the interchange units 22, exits from the assembly 20, adjacent the top thereof, by way of a transversely elongated, four inch main discharge header 26, this header being in communication with a discharge fitting 27 extending through the second casing end wall 17'.

Like supply fitting 23, the fitting 27 has appropriate closure plugs 28 at its ends; and these fittings communicate with the units 22 and with main supply and discharge headers 24, 26 in a manner to be described. As appears in FIG. 1, header 26 is supported on the casing wall 17' by an appropriate bracket 29.

The cooling water, as pressurized by an appropriate pump (not shown) enters the assembly 10 of the interchange units 22 through a supply pipe fitting 30 which extends through the end wall 17 at a quite elevated point, as appears in FIG. 7. Fitting 30 communicates directly with the interior of an upright stilling box or chamber 32, whence liquid flows into and over the interchange units 22 in a fashion to be described. Having descended the sides of the units 22, the cooling water exits from the interchange assembly 10 through a pipe fitting 33 (FIG. 1), which fitting receives the coolant overflow from an inclined collector trough 34 extending below the entire assemblage 10 of interchange units 22.

As indicated in FIGS. 1 and 2, the supply fitting 23 for the liquid to be cooled communicates downwardly with the transverse supply header 24 adjacent one end of the latter, as through openings milled in these supply parts sealed by welded connections around the joints. The discharge header 26 for the cooled liquid is similarly connected in sealed relation to the discharge fitting 27, but adjacent the end of the header 26 which is opposite that at which the supply header 24 is joined to fitting 23.

Each of the interchange units 22 is constituted by two basic components, namely a heat transfer plate part, generally designated 36, and a large size manifold-like distributor part 37, details of which, and their relation to the plate 36, will later be described.

Each plate 36 is fabricated of a pair of sheet metal stampings in a generally flat and hollow, vertically elongated form, being, for example, about 110 inches in height in the illustrated installation, although this dimension is of course capable of wide change, as well as in the horizontal dimension of the plate, since these considerations do not affect the functional aspect of the invention. The side margins of plates 36 are seam-welded at 36', and they are preferably ribbed or corrugated, as at 38, substantially co-extensive with the height thereof (FIG. 1) for a properly distributed upward flow therein of the liquid to be cooled. The ribbing 38 is somewhat in the manner of the patent to Yoder et al. referred to above.

The lower ends of the plates 36 each communicate downwardly with a continuous elongated bottom header 39 of considerably less diameter than the supply header 24 and as illustrated in FIG. 2, each bottom header 39 communicates at one end with the inner side of said supply header, as at a welded joint. The opposite ends of bottom headers 39 are plugged or otherwise closed, as indicated in FIG. 1.

Each transfer plate 36 is equipped along its upper edge with a top or discharge header 40 of the same size as the bottom supply header 39; and the headers 40 communicate at one end, as shown in FIGS. 1 and 3, with the inner side of the main transverse discharge header 26 for the cooled liquid, in the same manner that the bottom headers 39 are placed in sealed communication with main supply header 24. The opposite ends of top plate headers 40 abut the inner wall of cooling box 32, by which they are closed or, in the alternative, this header end may be individually plugged like the opposite end of bottom header 39.

The stilling box or chamber 32 supplies cooling water to all of the distributors 37 for plates 36, hence is desirably of large volumetric capacity. Thus, stilling box 32, in addition to being somewhat greater in horizontal width than the horizontal dimension transverse of the assembly 10 of transfer plate distributors 37 (which it serves in common) is, as illustrated in FIG. 1, of considerable height, as well as wall-to-wall breadth, so as to accumulate a large volume of water pump-supplied from the coolant source through fitting 30. Box 32 is normally filled to a high water level WL (FIGS. 4 and 5) to build up a substantial hydrostatic head for the distributors 37, for a purpose to be described. Cooling box 32 is fixedly secured in relation to the plates 36 adjacent one end of the latter, as by an appropriate flange 42 (FIG. 1).

Reference now being had to FIGS. 4 and 5, each of the distributors 37 is of sheet metal construction in its entirety; and it is in the cross-sectional contouring of certain parts of the distributors that an important aspect of the invention resides. They are substantially of the same horizontal length as the transfer plates 36 (FIG. 1), being positioned directly above the respective top headers 40 of those plates. Each distributor 37 is longitudinally aligned with a large-size entry opening 44 in the inner wall of the stilling box 32, and is weld-connected or otherwise sealingly joined about its sides to that wall, being closed at its opposite end (FIG. 1) by an upright plate 45.

It is seen by reference to FIG. 4 that the opening 44 for the distributor or manifold 37 is of considerable height and width, but that the upper edge of the opening is substantially beneath the top of the distributor, and well below the usual level WL in the stilling box, whence it follows that the substantial voume of water within the distributor is under a considerable static pressure head. Yet, because of the large area of opening 44, the liquid flow into distributor 37 is at slight velocity and with little or no turbulence. This is an important feature in the invention to which reference will later be made.

The distributor 37 comprises two like, but oppositely oriented, upright sheet metal walls 46 of very special contour, which walls are spaced transversely from one another, at the widest part of the distributor at a distance of, say, seven inches in a typical installation in which the overall height of distributor 37 approximates fourteen inches, or twice its maximum width. At the top, as viewed in FIG. 4, each wall 46 is formed to provide a downwardly offset lip or shoulder 48, this shoulder and the entire upper extremity of the wall being continuously rectilinear along the entire length of the distributor 37. Wall 46 curves laterally and convexly outwardly from the top of shoulder 48, then extends divergently downwardly at a portion 49 in an angle A to the vertical of, say, 7°. Portion 49 then merges gradually with a mildly outwardly convex belly portion 50 which may be on a radius R of, say, seven inches, centered on the opposite wall 46. This arcuate portion 50 of the wall 46 converges inwardly and downwardly, at an angle B of approximately 30° to the vertical, in a lower flat wall portion 51, and that portion terminates along a bottom edge 52 located closely adjacent the side wall of the heat transfer plate 36 with which that particular distributor 37 is associated. The wall portions 51 quite closely embrace the top manifold 40 of the transfer plate.

A sheet metal bottom wall or floor 54 of elongated rectilinear shape for distributor 37 is welded or otherwise joined along its horizontal side edges within and along the walls 46, thereby sealing the cooling water-receiving space of the distributor from the space occupied by the header 40 directly therebelow. Floor plate 54 is, of course, similarly sealed at its ends to the inner stilling box wall, directly beneath the opening 44 of the latter, and to the opposite end closure plate 45.

The distributor 37 is completed by a pair of special sheet metal adapter stampings 56 within its walls 46 which have an important function, in conjunction with other structural features of the distributor arrangement. Like the outer wall 46, these stamps are identical to one another in cross-sectional outline, but are oriented oppositely of one another. They are continuously co-extensive in length with the distributor walls, and are welded, brazed or otherwise secured to the stilling box wall and end closure plate 45.

Each adapter 56 includes an inner flat, venturi-like control portion 57 angled inwardly and upwardly at about 35° to the vertical; and from the top of these control portions the adapter 56 is bent sharply outwardly and mildly downwardly at 58 to constitute a top ledge portion for the distributor upon which coolant water issuing upwardly from the interior of the latter will necessarily flow. The outer edge of the adapter ledge portion 58 is welded along its length to the bottom of wall shoulder 48.

The upper and inermost limits of the convergent adapter control portions 57 lie parallel to and relatively closely adjacent one another along the length thereof, thereby defining laterally restricted top orifice or mouth 60, through which a flow of water issues upwardly, then overflows the distributor, in the general manner indicated by arrows in FIG. 4.

FIG. 5 illustrates the actions that take place in the operation of the improved heat interchange unit 22, and in particular the distributor 37 thereof, this view depicting a bit more accurately the actual flow pattern than as generally shown in FIG. 4, but still with somewhat of an exaggeration in regard to the thickness of the coolant water film as it flows down the side walls 46 of distributor 37.

That is, the cooling liquid, as indicated above, enters the large volume interior of the distributor 37 through the stilling box-distributor opening 44 in a non-turbulent fashion and at slight velocity, notwithstanding the considerable head of liquid in the stilling box, due to the large area of the opening. As indicated in FIG. 5, pressure exists within the manifold substantially entirely in the form of a static upwardly acting head. The convergent venturi control portions 57 convert this pressure into a velocity effect, under which the water jets upwardly, as indicated by arrows in FIG. 5, through the elongated orifice 60, the height of the jet being limited to that of the water level WL in the stilling box 32.

So issuing, the water falls oppositely and downwardly onto the top ledge portions 58, where the shoulders 48 along the opposite sides of these ledges cause the water to dam up directly outwardly of orifice 60. Thus, a uniform volume of the jet-issued coolant accumulates along the ledges 58 along the entire length of the distributor, prior to overflowing the curved tops of distributor walls 46. It then flows downwardly in a perfectly distributed film along the upper portions 49 of walls, thence about the belly-portions 50.

The mild curvature of the last named portions enables the water film to flow down the terminal bottom portions 51 of distributor walls 46 smoothly and uniformly, without being centrifugally or inertially thrown from the walls. As gravitationally accelerated, the coolant water film passes smoothly from the lower edge 52 of wall 46 onto the adjacent side of the heat transfer plate 36, thence downwardly to the bottom of the interchange unit 22. It there collects in the inclined collector trough 34, whence it returns to its circulating pump through the discharge fitting 33, if recirculation of the coolant is wished.

Over and above the individual controls on the coolant flow, including the internal distributor pressure head, the venturi-induced upward jet, and the damned-up and disciplined film flow, the general flow pattern of the system as a whole is diagrammed by arrows in FIG. 7. The internally circulated liquid enters fitting 23, whence it passes to main supply header 24 and then through the individual bottom plate headers 39 of the heat transfer plate 22. It is forced upwardly through the later, thence into the respective top headers 40, the main discharge header 26, and outwardly through the common discharge fitting 27.

The cooling liquid enters the assembly 10 of interchange units 22 through the supply fitting 30 and into the stilling box 32, building up in large volume in the latter to the water level WL substantially above the top of the several openings 44 for the distributors 37. The remainder of the coolant flow, back through the common water return fitting 33, for recirculation if desired, has been described.

Improved structural features of the casing 11 for the assembly of units 22 contribute to ease and speed of manufacture of the casing at little cost, indeed, but still affording a very strong and rigid structure. In this matter particular reference should be had to FIG. 6, taken in conjunction with the other views.

The invention contemplates that the side walls 16, 16', the end walls 17, 17', the top wall 19, and a considerable portion of each upright corner articulating device 18 shall be of a non-metallic material, such as an appropriate and suitably stiff plastic sheeting having a certain degree of compressibility; yet with another portion of the articulating device being made of a weldable material enabling a welded bottom connection to a base channel 13.

For the purpose of making the connection, each of the side and end wall panels is equipped with a special connector piece 62 of the same plastic material, which piece is slotted along its length at 63 to receive the edge of the adjacent panel in a tongue and groove type of union. A suitable adhesive is employed for a strong union between the side and end wall panels and connector pieces 62.

The connector members 62 are coextensive in height with the respective wall panels 16, 16', 17 and 17', and each connector is integrally formed to provide a laterally projecting male formation or tongue 64 of bulged cross-section along its length, the connectors 62 extending laterally substantially beyond these formations. Each elongated adapter 66 is of the same, non-metallic material as the conectors 62 and serves to effect a fixed and rigid articulation of the adjacent conectors to one another. Adapter 66, coextensive in length with members 62, is molded to provide a pair of opposed, laterally spaced vertical channels 67 opening outwardly through restricted throats 68 of less width than the respective male formations 64, so that the connector member 62 may be engaged with the common adapter 66 therefor under a snap-on action performed manually with ease and speed by an operator.

Finally, each adapter 66 is formed to provide a vertically extending, outwardly opening groove 70 along its length to receive a vertically elongated T-bar 71 of steel, the stem of which bar is united to the adapter with the assistance of a suitable adhesive. The bottoms of bars 71 are weld-connected to the base channels 13 to complete the mount of casing 11 on the base 12.

As appears in FIG. 4, the top panel 19 is united to the side and end wall panels by laterally extending connector devices, specially designated 72, which are very similar to the corner articulating devices 18, hence have their parts designated by corresponding reference numerals, primed. In the case of top panel 19, a steel stamping 74 of upwardly flanged cross section has offset inner flanges 75 received and cemented in the grooves 70' of the adapter pieces 66'. The stamping 74 is weld-connected rigidly to the tops of the T-bars 71 of the upright corner articulating devices 18 to complete a very strong and rigid, but inexpensive, casing structure 11.

As for the assembly 10 of transfer plates 22 within casing 11, it is strongly supported at the union of the bottom headers 39 of the plate units to the lower transverse and larger header 24, as well as at the union of the upper headers 40 of plate units 22 to the rear transverse and upper header 26. Headers 24 and 26 extend through the side wall panels 16, 16' of casing 11, and are supported in this manner; and the support of the heat exchange structure may be supplemented by transverse bottom tube means across base 12, as shown in FIG. 1 at 76.

What is claimed is:

1. A falling film-type heat interchange unit, comprising an upright, hollow and generally flat heat transfer plate through which a first liquid is circulated for transfer of heat to or from a second liquid descending the external surface of the plate, and means receiving said second liquid from a source and effecting a film-like gravitational flow thereof over the external surface of the plate, comprising a hollow distributor substantially coextensive in horizontal length with the plate and disposed along and over the top of the latter, said distributor being of generous cross-sectional area as compared with the upper portion of the plate, said distributor having an elongated, laterally restricted orifice at the top thereof through which the liquid issues upwardly from the interior thereof, said orifice being bordered along a side thereof by liquid collecting means insuring a continuous and uninterrupted film flow over said external plate surface and along said horizontal length, the distributor being provided with a large sized opening at an end thereof through which said second liquid enters the distributor from said source, said opening being defined by an upper edge below the maximum liquid level in said distributor.

2. A falling film-type heat interchange unit, comprising an upright, hollow and generally flat heat transfer plate through which a first liquid is circulated for transfer of heat to or from a second liquid descending the external surface of the plate, said plate having lower and upper header means adjacent the bottom and top thereof for the reception of said first liquid for its upward flow in the plate and its discharge from the latter, and means receiving said second liquid from a source and effecting a film-like gravitational flow thereof over the external surface of the plate, comprising a hollow distributor substantially coextensive in horizontal length with the plate and disposed along and over the top of the latter, said distributor being of generous cross-sectional area as compared with the upper header means of the plate, said distributor having an elongated, laterally restricted orifice at the top thereof through which the liquid issues upwardly from the interior thereof, said orifice being bordered along a side thereof by liquid collecting means insuring a continuous and uninterrupted film flow over said external plate surface and along said horizontal length, the distributor being provided with a large sized opening at an end thereof through which said second liquid enters the distributor from said source, said opening being defined by an upper erge below the maximum liquid level in said distributor.

3. The interchange unit of claim 1, in which said means receiving the second liquid includes a stilling box of substantial volume from which the liquid enters through the large end opening of the distributor to the latter's interior at slight horizontal velocity.

4. The interchange unit of claim 2, in which said means receiving the second liquid includes a stilling box of substantial volume from which the liquid enters through the large end opening of the distributor to the latter's interior at slight horizontal velocity, said box being of a height greater than said opening whereby the second liquid in the distributor is held under a pressure head of liquid existing in the box.

5. An assembly of a plurality of interchange units in accordance with claim 1, said units being in transversely spaced vertical planes, said assembly comprising a common supply connection through which liquid flows to the distributors, a common collecter receiving that liquid from the exterior of the units, a main supply header common to said units from which the other liquid flows to the interior of said transfer plates, and a main discharge header common to said units into which said other liquid flows from said plates.

6. An assembly of a plurality of interchange units in accordance with claim 3, said units being in tranversely spaced vertical planes, said assembly comprising a common supply connection through which liquid flows to said stilling box for exit to the distributors of said units, a common collector receiving that liquid from the exterior of the units, a main supply header common to said units from which the other liquid flows to the interior of said transfer plates, and a main discharge header common to said units into which said other liquid flows from said plates.

7. A falling film-type heat interchange unit, comprising an upright, hollow and generally flat heat transfer plate through which a first liquid is circulated for transfer of heat to or from a second liquid descending the external surface of the plate, and means receiving said second liquid from a source and effecting a film-like gravitational flow thereof over the external surface of the plate, comprising a hollow distributor substantially coextensive in horizontal length with the plate and disposed along and over the top of the latter, said distributor being of generous cross-sectional area as compared with the upper portion of the plate, and being provided with a large sized opening at an end thereof through which said second liquid enters the distributor from said source, said distributor opening upwardly at a restricted orifice through which the second liquid issues upwardly under the pressure head in the distributor, said distributor having a horizontally extending upper external surface along a side of said orifice, which surface is laterally outwardly defined by a dam formation behind which the second liquid collects in part upon issuing from the orifice.

8. A falling film-type heat interchange unit, comprising an upright, hollow and generally flat heat transfer plate through which a first liquid is circulated for transfer of heat to or from a second liquid descending the external surface of the plate, and means receiving said second liquid from a source and effecting a film-like gravitational flow thereof over the external surface of the plate, comprising a hollow distributor substantially coextensive in horizontal length with the plate and disposed along and over the top of the latter, said distributor being of generous cross-sectional area as compared with the upper portion of the plate, and being provided with a large sized opening at an end thereof through which said second liquid enters the distributor from said source, said means receiving the second liquid including a stilling box of substantial volume from which the liquid enters through the large end opening of the distributor to the latter's interior at slight horizontal velocity, said distributor opening upwardly at a restricted orifice through which the second liquid issues upwardly under the pressure head in the distributor, said distributor having a horizontally extending upper external surface along a side of said orifice, which surface is laterally outwardly defined by a dam formation behind which the second liquid collects in part upon issuing from the orifice, said formation being continuously rectilinear horizontally along the top thereof.

9. A falling film-type heat interchange unit, comprising an upright, hollow and generally flat heat transfer plate through which a first liquid is circulated for transfer of heat to or from a second liquid descending the external surface of the plate, said plate having lower and upper header means adjacent the bottom and top thereof for the reception of said first liquid for its upward flow in the plate and its discharge from the latter, and means receiving said second liquid from a source and effecting a film-like gravitational flow thereof over the external surface of the plate, comprising a hollow distributor substantially coextensive in horizontal length with the plate and disposed along and over the top of the latter, said distributor being of generous cross-sectional area as compared with the upper header means of the plate, and being provided with a large sized opening at an end thereof through which said second liquid enters the distributor from said source, said means receiving the second liquid including a stilling box of substantial volume from which the liquid enters through the large end opening of the distributor to the latter's interior at slight horizontal velocity, said box being of a height greater than said opening whereby the second liquid in the distributor is held under a pressure head of liquid existing n the box, said distributor opening upwardly at a restricted orifice through which the second liquid issues upwardly under the pressure head in the distributor, said distributor having a horizontally extending upper external surface along a side of said orifice, which surface is laterally outwardly defined by a dam formation behind which the second liquid collects in part upon issuing from the orifice, said formation being continuously rectilinear horizontally along the top thereof.

10. An improvement in a falling film-type- heat interchange unit characterized by an upright heat transfer plate having an elongated distributor manifold over the top thereof from which a liquid gravitates along a side of the plate; in accordance with which improvement the manifold has an elongated, laterally restricted orifice at the top thereof through which the liquid issues upwardly from said interior, said orifice being bordered along a side thereof by a liquid accumulating surface, which surface is laterally defined outwardly of the orifice by an elongated dam formation over which the liquid flows to gravitate down the side of the plate, said dam formation being continuously rectilinear along the top thereof.

11. An assembly of a plurality of interchange units incorporating the improvement of claim 12, said units being in transversely spaced vertical planes, said assembly comprising a common supply connection through which liquid flows to the manifolds of said units, and a common collector receiving that liquid from the exterior of the units.

12. An improvement in a falling film-type heat interchange unit charatcerized by an upright heat transfer plate having an elongated distributor manfiold over the top thereof from which a liquid gravitates along a side of the plate; in accordance with which improvement the manifold is of large internal volume and has an end opening of comparable cross-sectional area receiving said liquid in the manifold interior from a source, said manifold having an elongated, laterally restricted orifice at the top thereof through which the liquid issues upwardly from said interior, said orifice being bordered along a side thereof by a liquid accumulating surface, which is laterally defined outwardly of the orifice by an elongated dam formation over which the liquid flows to gravitate down the side of the plate, said dam formation being continuously rectilinear along the top thereof 13. An improvement in a falling film-type heat interchange unit characterized by an upright heat transfer plate having an elongated distributor manifold over the top thereof from which a liquid gravitates along a side of the plate; in accordance with which improvement the manifold has an elongated, laterally restricted orifice at the top thereof through which the liquid issues upwardly from said interior, said orifice being bordered along a side thereof by a liquid accumulating surface, which surface is laterally defined outwardly of the orifice by an elongated dam formation over which the liquid flows to gravitate down the side of the plate, said dam formation being continuously rectilinear along the top thereof, an internal wall of said distributor manifold converging upwardly to said restricted orifice to impart upward velocity to liquid issuing through the orifice.

14. An improvement in a falling film-type heat interchange unit characterized by an upright heat transfer plate having an elongated distributor manifold over the top thereof from which a liquid gravitates along a side of the plate; in accordance with which improvement the manifold is of large internal volume and has an end opening of comparable cross-sectional area receiving said liquid in the manifold interior from a source, said manifold having an elongated, laterally restricted orifice at the top thereof through which the liquid issues upwardly from said interior, said orifice being bordered along a side thereof by a liquid accumulating surface, which surface is laterally defined outwardly of the orifice by an elongated dam formation over which the liquid flows to gravitate down the side of the plate, said dam formation being continuously rectilinear along the top thereof, an internal wall of said distributor manifold converging upwardly to said restricted orifice to impart upward velocity to liquid issuing through the orifice.

15. A falling film-type heat interchange unit, comprising an upright, hollow and generally flat heat transfer plate through which a first liquid is circulated for transfer of heat to or from a second liquid descending the external surface of the plate, and means receiving said second liquid from a source and effecting a film-like gravitational flow thereof over the external surface of the plate, comprising a hollow distributor substantially coextensive in horizontal length with the plate and disposed along and over the top of the latter, said distributor being of generous cross-sectional area as compared with the upper portion of the plate, and being provided with a large sized opening at an end thereof through which said second liquid enters the distributor from said source, said opening being defined by an upper edge below the maximum liquid level in said distributor, said distributor having an upwardly opening orifice and a horizontally extending upper external surface along a side of said orifice, which surface is laterally outwardly defined by a dam formation behind which the second liquid collects in part upon issuing from the orifice.

16. A falling film-type heat interchange unit, comprising an upright, hollow and generally flat head transfer plate through which a first liquid is circulated for transfer of heat to or from a second liquid descending the external surface of the plate, said plate having lower and upper header means adjacent the bottom and top thereof for the reception of said first liquid for its upward flow in the plate and its discharge from the latter, and means receiving said second liquid from a source and effecting a film-like gravitational flow thereof over the external surface of the plate, comprising a hollow distributor substantially co-extensive in horizontal length with the plate and disposed along and over the top of the latter, said distributor being of generous cross-sectional area as compared with the upper header means of the plate, and being provided with a large sized opening at an end thereof through which said second liquid enters the distributor from said source, said opening being defined by an upper edge below the maximum liquid level in said distributor, said means receiving the second liquid including a stilling box of substantial volume from which the liquid enters through the large end opening of the distributor to the latter's interior at slight horizontal velocity, said box being of a height greater than said opening whereby the second liquid in the distributor is held under a pressure head of liquid existing in the box, said distributor having an upwardly opening orifice and a horizontally extending upper external surface along a side of said orifice, which surface is laterally outwardly defined by a dam formation behind which the second liquid collects in part upon issuing from the orifice, said formation being continuously rectilinear horizontally along the top thereof.

References Cited

UNITED STATES PATENTS

| | | | |
|---|---|---|---|
| 2,040,947 | 5/1936 | Mojonnier et al. | 165—115 X |
| 2,169,054 | 8/1939 | Mojonnier | 165—115 X |
| 2,249,846 | 7/1941 | Mojonnier | 165—115 X |
| 2,616,670 | 11/1952 | Van Der Molen | 165—115 |
| 3,290,025 | 12/1966 | Engalitcheff | 261—112 X |

ROBERT A. O'LEARY, Primary Examiner

A. W. DAVIS, JR., Assistant Examiner

U.S. Cl. X.R.

52—282; 159—13; 261—112, 153